United States Patent
Fang et al.

(10) Patent No.: US 12,345,585 B2
(45) Date of Patent: Jul. 1, 2025

(54) FEW-MODE RAYLEIGH-BASED DISTRIBUTED FIBER SENSOR FOR SIMULTANEOUS TEMPERATURE AND STRAIN SENSING

(71) Applicant: NEC Laboratories America, Inc., Princeton, NJ (US)

(72) Inventors: Jian Fang, Princeton, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 86 days.

(21) Appl. No.: 17/966,869

(22) Filed: Oct. 16, 2022

(65) Prior Publication Data

US 2023/0125375 A1    Apr. 27, 2023

Related U.S. Application Data

(60) Provisional application No. 63/270,218, filed on Oct. 21, 2021.

(51) Int. Cl.
  *G01L 1/24*     (2006.01)
  *G01K 11/32*    (2021.01)
  *G01K 11/3206*  (2021.01)
  *G01K 1/26*     (2006.01)

(52) U.S. Cl.
  CPC ............. *G01L 1/242* (2013.01); *G01K 11/32* (2013.01); *G01K 11/3206* (2013.01); *G01K 1/26* (2013.01)

(58) Field of Classification Search
  CPC ...... G01K 1/26; G01K 11/32; G01K 11/3206; G01L 1/242
  See application file for complete search history.

(56) References Cited

U.S. PATENT DOCUMENTS

| | | | |
|---|---|---|---|
| 9,581,489 B2 * | 2/2017 | Skinner | G01H 9/004 |
| 10,634,551 B2 * | 4/2020 | Galtarossa | G01D 5/268 |
| 10,634,553 B1 * | 4/2020 | Hveding | G01H 9/004 |
| 10,880,007 B1 * | 12/2020 | Hveding | G02B 6/29361 |
| 2009/0304322 A1 | 12/2009 | Davis et al. | |
| 2021/0018343 A1 | 1/2021 | Takahashi et al. | |

FOREIGN PATENT DOCUMENTS

WO    WO-2023069333 A1 *   4/2023    ......... G01K 11/3206

* cited by examiner

*Primary Examiner* — Daniel Petkovsek
(74) *Attorney, Agent, or Firm* — Joseph Kolodka

(57) ABSTRACT

Aspects of the present disclosure describe Rayleigh-based DTSS that utilizes few-mode fiber (FMF), which supports multiple spatial modes. For each spatial mode, a wavelength-scanning configuration gives the relative wavelength (or frequency) shift between two consecutive measurements. The temperature and strain changes can therefore be separated through different temperature/strain sensitivities of various mode-pairs. Advantageously, Rayleigh-based DTSS according to aspects of the present disclosure removes temperature-strain ambiguity, enhances measurement accuracy, reduces errors. and enables new features for multiparameter sensing.

5 Claims, 4 Drawing Sheets

FEW-MODE RAYLEIGH-BASED DISTRIBUTED FIBER SENSOR FOR SIMULTANEOUS TEMPERATURE AND STRAIN SENSING

CROSS REFERENCE

This application claims the benefit of U.S. Provisional Patent Application Ser. No. 63/270,218 filed 21 Oct. 2021, the entire contents of which being incorporated by reference as if set forth at length herein.

TECHNICAL FIELD

This disclosure relates generally to distributed fiber optic sensing (DFOS) systems, methods, and structures and more particularly to a novel Rayleigh-based distributed temperature/strain sensing (DTSS).

BACKGROUND

Distributed fiber optic sensing (DFOS) technologies have been widely studied and developed for decades, due to their capability to monitor environmental variables (such as temperature, strain, vibration, acoustic, etc.) with long sensing distance and high accuracy. The DFOS can exploit different scattering processes in optical fibers, such as Rayleigh scattering, Brillouin scattering, Raman scattering, etc. Among them, Rayleigh scattering reflects with the highest backscatter power and is highly sensitive to the measurands. Therefore, Rayleigh-based DFOS has been used in a wide range of applications, including the distributed acoustic sensing (DAS), distributed vibration sensing (DVS), and the distributed temperature/strain sensing (DTSS).

Rayleigh-based DTSS can measure the relative temperature and strain changes. Compared with the Raman-based and Brillouin-based sensors, Rayleigh-based DTSS exhibits higher sensitivity and a very long sensing distance. Therefore, Rayleigh-based DTSS has become of great interest. However, since a Rayleigh signal is sensitive to both temperature and strain, in principle the DTSS sensor cannot distinguish temperature and strain from one another—within the conventional single-mode fibers (SMF) This "temperature-strain cross-sensitivity" has been a long-standing issue, resulting in measurement ambiguity, which affects sensing performance.

SUMMARY

The above problem is solved and an advance in the art is made according to aspects of the present disclosure directed a novel Rayleigh-based DTSS.

In sharp contrast to the prior art that uses single-mode optical fiber, the Rayleigh-based DTSS according to aspects of the present disclosure utilizes few-mode fiber (FMF), which supports multiple spatial modes.

For each spatial mode, a wavelength-scanning configuration gives the relative wavelength (or frequency) shift between two consecutive measurements. The temperature and strain changes can therefore be separated through different temperature/strain sensitivities of various mode-pairs. Advantageously, Rayleigh-based DTSS according to aspects of the present disclosure removes temperature-strain ambiguity, enhances measurement accuracy, reduces errors. and enables new features for multi-parameter sensing.

As will become apparent to those skilled in the art, our inventive approach according to aspects of the present disclosure is realized by: a few-mode wavelength-scanning coherent OTDR system; an accompanying method to measure the Rayleigh backscattering signal of various modes; and a method to separate temperature and strain through the measurements.

BRIEF DESCRIPTION OF THE DRAWING

A more complete understanding of the present disclosure may be realized by reference to the accompanying drawing in which.

DESCRIPTION

Figure 1:
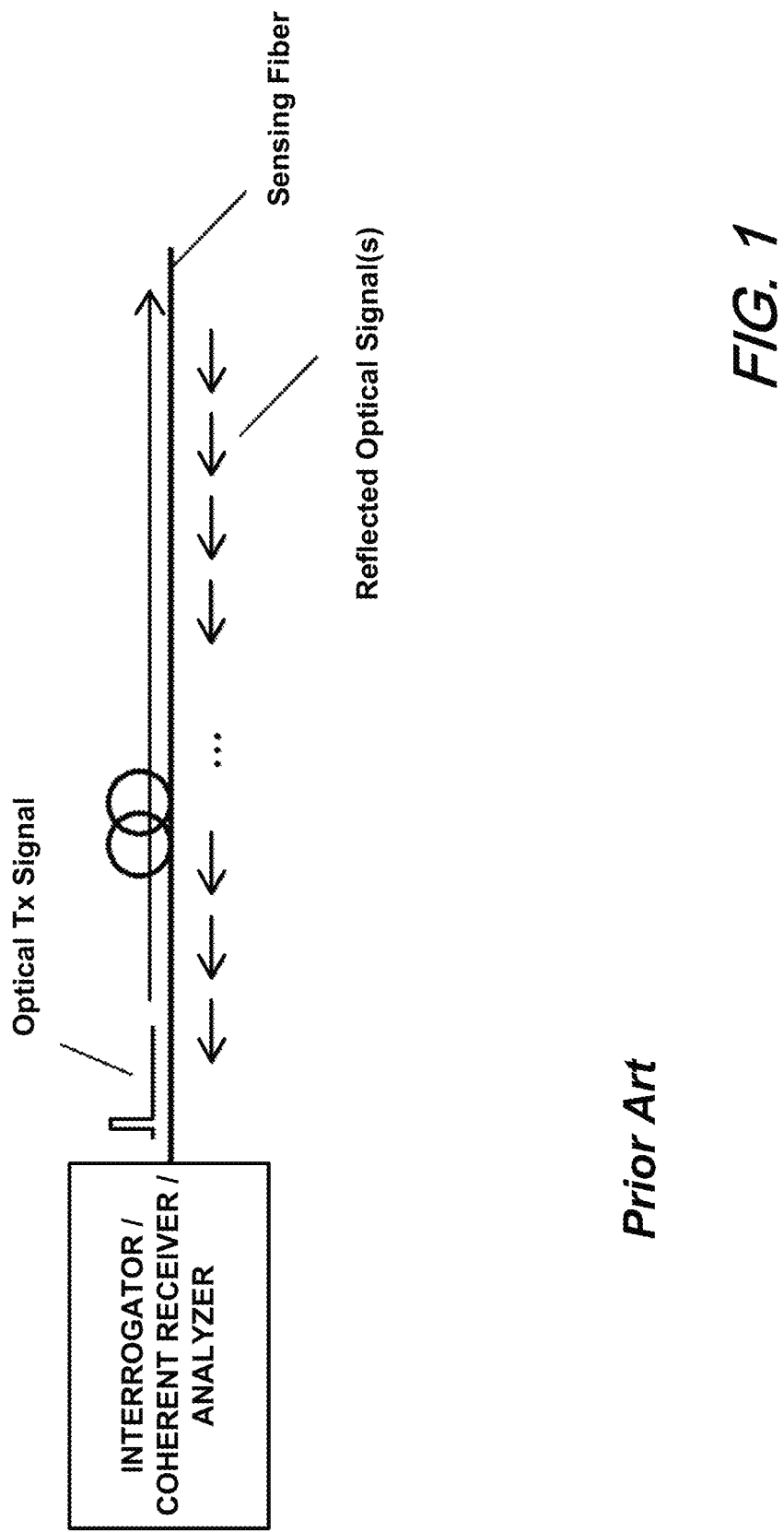
FIG. 1 is a schematic diagram illustrating a DFOS system known in the art.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting that distributed fiber optic sensing (DFOS) is an important and widely used technology to detect environmental conditions (such as temperature, vibration, acoustic excitation vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. DFOS can also employ a signal of forward direction that uses speed differences of multiple modes. Without losing generality, the following description assumes reflected signal though the same approaches can be applied to forwarded signal as well.

FIG. 1 is a schematic diagram of a generalized, prior-art DFOS system. As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration. As will be understood and appreciated, the interrogator may include a coded DFOS system that may employ a coherent receiver arrangement known in the art.

The reflected signal is converted to electrical domain and processed inside the interrogator. Based on the pulse injection time and the time signal is detected, the interrogator determines at which location along the fiber the signal is coming from, thus able to sense the activity of each location along the fiber.

Those skilled in the art will understand and appreciate that by implementing a signal coding on the interrogation signal enables the sending of more optical power into the fiber which can advantageously improve signal-to-noise ratio (SNR) of Rayleigh-scattering based system (e.g. distributed acoustic sensing or DAS) and Brillouin-scattering based system (e.g. Brillouin optical time domain reflectometry or BOTDR).

As currently implemented in many contemporary implementations, dedicated fibers are assigned to DFOS systems in fiber-optic cables—physically separated from existing optical communication signals which are conveyed in different fiber(s). However, given the explosively growing bandwidth demands, it is becoming much more difficult to economically operate and maintain optical fibers for DFOS operations only. Consequently, there exists an increasing interest to integrate communications systems and sensing systems on a common fiber that may be part of a larger, multi-fiber cable.

Operationally, we assume that the DFOS system will be Rayleigh-scattering based system (e.g., distributed acoustic sensing or DAS) and Brillouin-scattering based system (e.g., Brillouin optical time domain reflectometry or BOTDR) with a coding implementation. With such coding designs, these systems will be most likely be integrated with fiber communication systems due to their lower power operation and will also be more affected by the optical amplifier response time.

As previously noted, distributed fiber optic sensing (DFOS) technologies have been widely studied and developed for decades, due to their ability to monitor environmental variables (such as temperature, strain, vibration, acoustic, etc.) with long sensing distance and high accuracy. Of particular interest, Rayleigh-based DFOS have been used in a wide range of applications, including the distributed acoustic sensing (DAS), distributed vibration sensing (DVS), and the distributed temperature/strain sensing (DTSS).

Advantageously, Rayleigh-based DTSS can measure relative temperature and strain changes. As compared with the Raman-based and Brillouin-based sensors, Rayleigh-based DTSS exhibits much higher sensitivity and a very long sensing distance. However, since the Rayleigh signal is sensitive to both temperature and strain, the DTSS sensor cannot distinguish between them within a conventional single-mode fibers (SMF) This "temperature-strain cross-sensitivity" has been a long-standing issue, resulting in measurement ambiguity, which affects sensing performance.

The present disclosure is directed to a novel Rayleigh-based DTSS technology that solves this temperature-strain cross-sensitivity problem. Different from the conventional solutions that use single-mode fiber, our inventive approach utilizes few-mode fiber (FMF), which supports multiple spatial modes. For each spatial mode, a wavelength-scanning configuration provides a relative wavelength (or frequency) shift between two consecutive measurements. The temperature and strain changes can therefore be separated through the different temperature/strain sensitivities of various mode-pairs. As a result, our inventive approach removes the temperature-strain ambiguity, enhances measurement accuracy, reduces errors. and enables new features for multi-parameter sensing.

Few-Mode Wavelength-Scanning Coherent OTDR System

Figure 2:
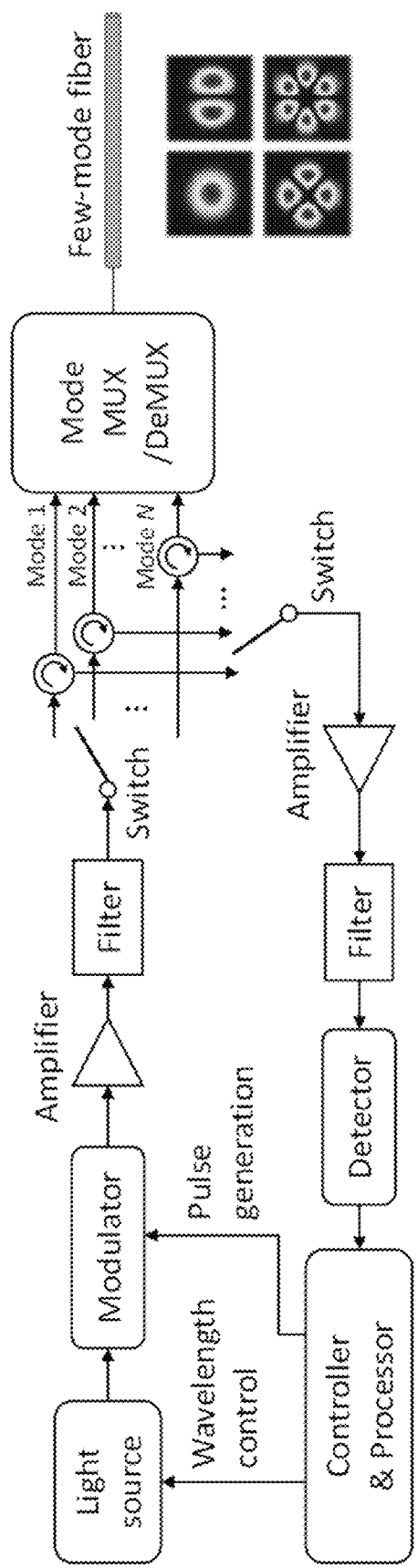
FIG. 2 is a schematic diagram showing an illustrative configuration of few-mode wavelength-scanning coherent optical time domain reflectometry (OTDR) according to aspects of the present disclosure.

FIG. 2 is a schematic diagram showing an illustrative configuration of few-mode wavelength-scanning coherent optical time domain reflectometry (OTDR) according to aspects of the present disclosure.

With reference to that figure, we note that the light source shown therein could be a distributed feedback (DFB) laser, an external cavity laser (ECL), or any other type of laser which supports wavelength tuning. The controller & processor is configured to change the wavelength of the light source to m different wavelengths, i.e. $\lambda_1, \lambda_2, \ldots, \lambda_m$. The light output by the light source is shaped into optical pulses through the effect of a modulator, which may be an acousto-optic modulator (AOM), or a semiconductor optical amplifier (SOA), etc.

The shaped optical pulses are directed to an optical amplifier, such as an Erbium-doped fiber amplifier (EDFA) which boosts optical pulse power to a desired power level. A following filter takes as input the output of the amplifier and reduces any noise introduced by the amplifier. The filtered pulses are then received by a polarization control device (polarization controller or polarization scrambler)—which is optional—which adjusts the polarization state of the pulses (not specifically shown).

As shown in the figure, a sensing media according to aspects of the present disclosure is a few-mode fiber (FMF) which supports N spatial modes (could be LP modes, vector modes, etc.). A mode-selective multiplexer (MUX) or de-multiplexer (DeMUX) is used to couple/convert an optical signal from the fundamental mode in an SMF to a particular spatial mode in the FMF.

Note that the MUX/DeMUX should preferably exhibit sufficient mode extinction to avoid mode leakage. As shown in the figure, a switch device is used for selectively exciting the desired spatial mode via the mode MUX/DeMUX. Then the optical signal of a particular spatial mode is launched into the FMF, while the Rayleigh scattering propagates backward.

It is worth noting that both intramodal and intermodal Rayleigh scattering will occur in FMF. The backscattering signals of various spatial modes are converted to the fundamental modes again in the mode MUX/DeMUX and can be collected by the circulators. In this scheme, only one detector is used, so that another switch device is required to select a particular mode to collect. If more detectors are available, the Rayleigh signals multiple modes can be collected simultaneously, which will accelerate the measurement speed.

If the Rayleigh signal is weak, another amplifier can be used before the detector. The output of the detector is then collected by an analog-to-digital (ADC) device, and the data are stored and proceeded by the processor unit. Note that the figure illustrates only one illustrative configuration with direct detection. However, our inventive concepts also include coherent detection as an alternative, in which a portion of the light source is used as the local oscillator and mixed with the backscattered signal in a balanced detector or a coherent receiver. Direct detection gives a simpler setup which may reduce the system cost, while coherent detection provides higher sensitivity and SNR which may benefit the long-distance sensing performance.

Figure 3:
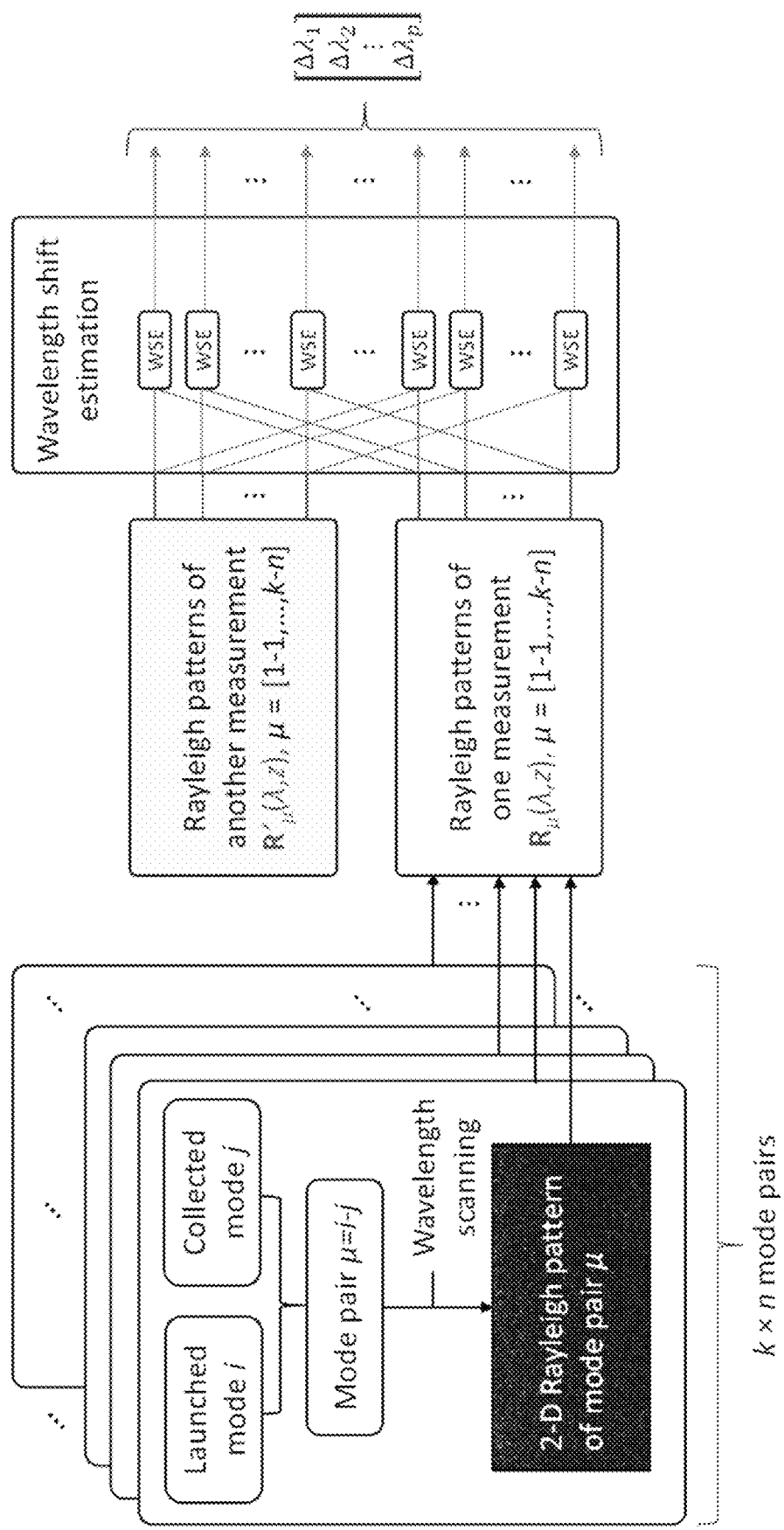
FIG. 3 is a schematic diagram illustrating Rayleigh pattern measurement and wavelength shift estimation (WSE) according to aspects of the present disclosure.

FIG. 3 is a schematic diagram illustrating Rayleigh pattern measurement and wavelength shift estimation (WSE) according to aspects of the present disclosure.

Measurement of Rayleigh Backscattering Signal of Various Spatial Mode-Pairs

It is known that in FMF, the injected light of one spatial mode will excite backscattering light into all the spatial modes. For each wavelength of the light, our system selectively launches the light in one spatial mode i, and collects the Rayleigh backscattering of a particular spatial mode j.

The launched mode i and collected mode j form one mode pair $\mu=i-j$, as shown in FIG. 3. The mode-pair corresponds to the "intramodal" Rayleigh scattering if $i=j$, and corresponds to the "intermodal" Rayleigh scattering if i and j are different. By scanning the wavelength of the light source and stacking the detector output signals, a 2-dimensional Rayleigh pattern of mode-pair $\mu$ can be constructed as $R_\mu(\lambda, z)$.

The physical nature behind the 2-D Rayleigh pattern is the wavelength (or frequency) dependence of Rayleigh scattering power which is unique to each piece of fiber. To some extent, it is similar to a fingerprint or an iris pattern which are unique to individuals. The process is repeated to other mode-pairs by injecting and collecting the light of different modes. For an FMF supporting N spatial modes, suppose that k ($1 \leq k \leq N$) modes are selected launching into the fiber, and n ($2 \leq n \leq N$) modes are collected as backscattering signals. Thus, the launched modes and received modes form k×n mode-pairs. By repeating the wavelength scanning process, all the 2-D Rayleigh patterns of the selected mode-pairs are constructed and stored. In this invention, this stage is defined as one complete measurement. In practical application, one complete measurement needs to be finished within a reasonable time so that the temperature and strain can be treated unchanged during the wavelength scanning and mode selecting process.

The next step estimates the wavelength shift between two complete measurements, of which the Rayleigh patterns of all mode-pairs are denoted as $R_\mu(\lambda, z)$ and $R_\mu'(\lambda, z)$, respectively. The wavelength shift is estimated through the following process:

First, select one mode-pair h from the $R_\mu(\lambda, z)$ and other mode-pair g from $R_\mu'(\lambda, z)$. Pick the corresponding 2-D Rayleigh patterns, i.e. $R_h(\lambda, z)$ and $R_g'(\lambda, z)$.

Second, for each distance z, slice the 2-D Rayleigh patterns as 1-D curves of wavelength, i.e. $R_h(\lambda)$ and $R_g'(\lambda)$.

Third, conduct the cross-correlation calculation between these two curves. The calculation of cross-correlation can be executed in various ways, such as direct correlation, generalized cross-correlation (with phase transform), or other modified algorithms. Interpolation may be used here to increase the number of points of cross-correlation.

Fourth, estimate the relative wavelength shift through the cross-correlation. The estimating method includes peak searching, curve fitting, neural networks, or other modified algorithms.

Fifth, repeat the process (2)-(4) for all the positions in the fiber. Then we have the wavelength shift information of the whole FMF.

Sixth, repeat the process (1)-(5) for all the selected mode-pairs. Then we obtain the wavelength shift between various mode-pairs.

Several things should be noted here: First, for the same mode-pair (i.e. h=g) the maximal detectable range of temperature/strain is related to the wavelength scanning range. Therefore, the temperature/strain change between two complete measurements should not exceed the maximal detectable range. Second, for different mode-pairs (i.e. h≠g) the birefringence may correspond to a larger wavelength gap, thus the wavelength scanned range should also cover those gaps of different mode-pairs that will be used in the analysis.

Separation of Temperature and Strain Changes

Prior knowledge of the temperature and strain sensitivities is required for each selected mode pair in the FMF. Therefore, pre-calibration is usually conducted through the following steps:

First, select the mode-pairs to be calibrated.

Second, keep the environmental factors (temperature/strain) stable, conduct one complete measurement to acquire the 2-D Rayleigh patterns via wavelength scanning.

Third, increase the temperature or strain with a fixed step, conduct another complete measurement to acquire the 2-D Rayleigh patterns through wavelength scanning.

Fourth, calculate the wavelength shift of (intermodal, intramodal) mode-pairs between the complete measurement in (3) and its previous complete measurement.

Fifth, repeat (3)-(4) until the temperature/strain change reaches the desired range, record the value of temperature/strain changes and the corresponding wavelength shift of the selected mode-pairs.

Sixth, conduct linear curve fitting of the wavelength shift v.s. temperature/strain change. The slope of the fitted curve will be the sensitivity of the temperature/strain.

In principle, the relative wavelength shift $\Delta\lambda_\mu$ of a mode-pair $\mu$ has a linear relationship with the temperature change $\Delta T$ or the strain change $\Delta\varepsilon$, i.e. $\Delta\lambda_\mu = s_{T,\mu}\Delta T + s_{\varepsilon,\mu}\Delta\varepsilon$, where $s_{T,\mu}$ and $s_{\varepsilon,\mu}$ are the temperature and strain sensitivity to the wavelength shift. In FMF, the Rayleigh scattering can be described as the discrete scattering model, in which the backscattering process is the summation of reflecting the light of many scatterers with random distribution in the fiber. The phase difference between two backscattered waves from two scatterers is given by $\Delta\phi = \Delta L(n_{eff,i} + n_{eff,j})/\lambda$, where $\Delta L$ is the length between two scatterers, $\lambda$ is the wavelength of the light, $n_{eff,i}$ and $n_{eff,j}$ are the effective refractive indices of the injected mode i and the collected backscattering mode j, respectively. The Rayleigh signal $S(\lambda, z)$ can be expressed as the total interference of all the backscatters with the corresponding phase difference, i.e. $S(\lambda, z) \propto \Sigma\, r(\Delta\phi, z)$, which function $r(\cdot)$ depends on detection type, e.g. direct detection or coherent detection. When temperature or strain changes, the refractive index of the few-mode fiber structure (core, cladding, etc) will change due to the elastic-optic effect. As the result, the effective refractive indices of the spatial modes will also change as functions of temperature and strain, i.e. $n_{eff}(T, \varepsilon)$.

Considering the phase difference between two scatterers in the discrete scattering model, when the temperature and strain change, both $n_{eff}(T, \varepsilon)$ and $\Delta L$ will vary accordingly, thus the Rayleigh signal $S(\lambda, z)$ will appear as a different shape. On the other hand, the wavelength can be tuned to another value $\lambda'$ so that the phase difference is identical to the value before temperature or strain change. Therefore, the Rayleigh signal $S(\lambda', z)$ could be the same as $S(\lambda, z)$ at location z, and the $\Delta\lambda=\lambda'-\lambda$ is the corresponding wavelength shift described in WSE. By properly designing the FMF profile, the wavelength shifts of some spatial mode-pairs have different sensitivities to the temperature/strain change. These mode-pairs can be used in the separation of temperature and strain.

If p≥2 mode-pairs are selected, and their wavelength shift have been estimated as $\Delta\lambda_1, \ldots \Delta\lambda_p$. Then we have the following equation with the pre-calibrated sensitivities:

$$\begin{bmatrix} \Delta\lambda_1 \\ \vdots \\ \Delta\lambda_p \end{bmatrix} = \underbrace{\begin{bmatrix} S_{T,1} & S_{\varepsilon,1} \\ \vdots & \vdots \\ S_{T,p} & S_{\varepsilon,p} \end{bmatrix}}_{S} \begin{bmatrix} \Delta T \\ \Delta\varepsilon \end{bmatrix}.$$

When two mode-pairs are used, i.e. p=2, the temperature change $\Delta T$ and strain change $\Delta\varepsilon$ can be obtained by simply inverting the matrix S if S has a non-zero determinant. In this invention, a general technique called weighted least square (WLS) regression is used. Considering that for the selected mode-pairs, the uncertainties of the estimated wavelength shift are denoted as $\sigma_1, \sigma_2, \ldots, \sigma_p$. Therefore, the temperature and strain changes can be estimated through:

$$\begin{bmatrix} \Delta T \\ \Delta\varepsilon \end{bmatrix} = (S^T D S)^{-1} S^T D \begin{bmatrix} \Delta\lambda_1 \\ \vdots \\ \Delta\lambda_p \end{bmatrix},$$

where D is a diagonal weight matrix with elements $D_{ii}=1/\sigma_i^2$. Note that the above equation can be simplified if the selected mode-pairs have similar wavelength shift uncertainties. In this case, it can be expressed as the following degenerated form:

$$\begin{bmatrix} \Delta T \\ \Delta\varepsilon \end{bmatrix} = (S^T S)^{-1} S^T \begin{bmatrix} \Delta\lambda_1 \\ \vdots \\ \Delta\lambda_p \end{bmatrix},$$

where $(S^T S)^{-1} S^T$ is also called the Moore-Penrose pseudoinverse of S. By using more mode pairs, the accuracy of temperature and strain separation will be greatly improved.

Figure 4:
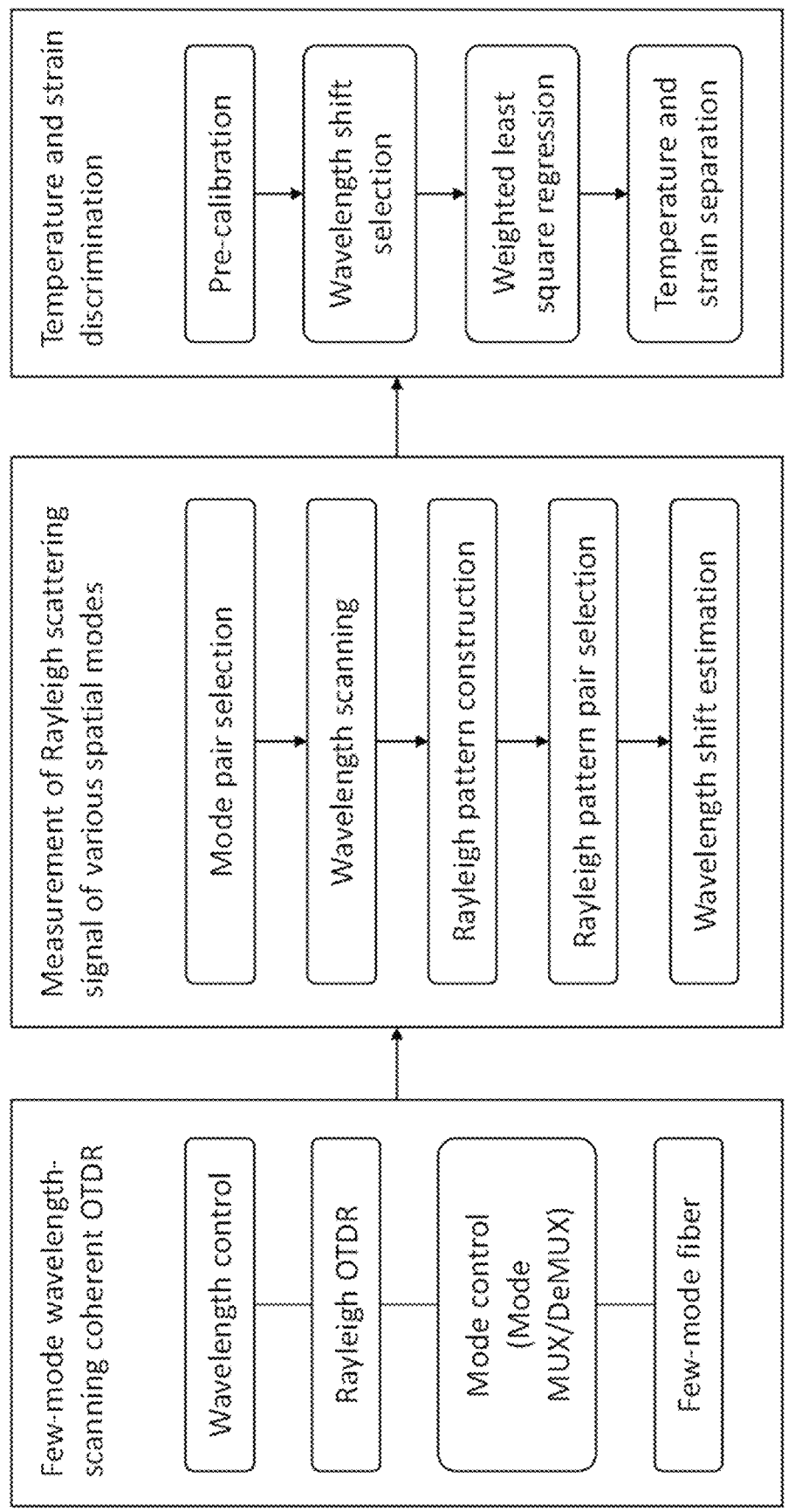
FIG. 4 is a schematic diagram showing illustrative features of a few-mode approach according to aspects of the present disclosure.

It is noted that the described technique gives the relative temperature and strain change between the two measurements, which is similar to Brillouin-based fiber sensors. Therefore, the baseline should be properly calibrated. For measuring the absolute value of temperature, other devices may be required such as the thermometers or a Raman-based DTS FIG. 4 is a schematic diagram showing illustrative features of a few-mode approach according to aspects of the present disclosure.

At this point, while we have presented this disclosure using some specific examples, those skilled in the art will recognize that our teachings are not so limited. Accordingly, this disclosure should only be limited by the scope of the claims attached hereto.

The invention claimed is:

1. A few-mode, wavelength-scanning, coherent optical time domain reflectometry system comprising:
a wavelength-tunable light source configured to generate light;
a modulator configured to generate light pulses from light received from the wavelength-tunable light source;
a controller configured to control/tune wavelength(s) of light output by the wavelength tunable light source and control light pulse generation by the modulator;
a first amplifier configured to amplify the light pulses generated by the modulator;
a filter configured to filter the amplified light pulses;
a sensing media comprising a few-mode fiber (FMF) that supports N spatial modes;
a mode-selective multiplexer (MUX)/demultiplexer (DEMUX) configured to couple/convert an optical signal from the fundamental mode in a single mode fiber (SMF) to a particular spatial mode in the FMF, the MUX/DEMUX located in an optical path between the filter and the FMF; and
a first switch configured to selectively excite a desired spatial mode via the MUX/DEMUX, said first switch located in an optical path between the filter and the MUX/DEMUX;
said system configured to
launch a particular spatial mode into the FMF while Rayleigh scattering propagates backward;
convert backscattered signals of various spatial modes into fundamental modes by the MUX/DEMUX;
selecting, by a second switch, a particular fundamental mode to collect; and
directing the collected fundamental mode to a detector, the detector configured to provide output to an analog-to-digital converter, the digital output of which is directed to the controller for processing;
said system further comprising a second amplifier positioned in an optical path between the second switch and the detector, said second amplifier configured to amplify selected scattering modes prior to detection;
wherein the light source is one selected from the group consisting of distributed feedback (DFB) laser, external cavity laser and another wavelength-tunable light source;
wherein the controller is configured to control wavelength tuning of m different wavelengths;
wherein the first that amplifies the pulses generated by the modulator is an acousto-optic-modulator (AOM), or a semiconductor optical amplifier (SOA);
wherein said system is configured to selectively launch light of one spatial mode i, and collect Rayleigh backscatter of a particular spatial mode j, wherein the launch mode i and the collected mode j, form one mode-pair u=i−j; and
wherein the mode-pair corresponds to intramodal Rayleigh scattering if i=j and corresponds to intermodal if i≠j.

2. The system of claim 1 wherein the detector is a coherent receiver.

3. A few-mode, wavelength-scanning, coherent optical time domain reflectometry system comprising:
a wavelength-tunable light source configured to generate light;
a modulator configured to generate light pulses from light received from the wavelength-tunable light source;
a controller configured to control/tune wavelength(s) of light output by the wavelength tunable light source and control light pulse generation by the modulator;

a first amplifier configured to amplify the light pulses generated by the modulator;

a filter configured to filter the amplified light pulses;

a sensing media comprising a few-mode fiber (FMF) that supports N spatial modes;

a mode-selective multiplexer (MUX)/demultiplexer (DEMUX) configured to couple/convert an optical signal from the fundamental mode in a single mode fiber (SMF) to a particular spatial mode in the FMF, the MUX/DEMUX located in an optical path between the filter and the FMF; and a first switch configured to selectively excite a desired spatial mode via the MUX/DEMUX, said first switch located in an optical path between the filter and the MUX/DEMUX;

said system configured to launch a particular spatial mode into the FMF while Rayleigh scattering propagates backward;

convert backscattered signals of various spatial modes into fundamental modes by the MUX/DEMUX;

selecting, by a second switch, a particular fundamental mode to collect; and directing the collected fundamental mode to a detector, the detector configured to provide output to an analog-to-digital converter, the digital output of which is directed to the controller for processing;

said system further comprising a second amplifier positioned in an optical path between the second switch and the detector, said second amplifier configured to amplify selected scattering modes prior to detection;

wherein the light source is one selected from the group consisting of distributed feedback (DFB) laser, external cavity laser and another wavelength-tunable light source;

wherein the controller is configured to control wavelength tuning of m different wavelengths;

wherein the first that amplifies the pulses generated by the modulator is an acousto-optic-modulator (AOM), or a semiconductor optical amplifier (SOA);

wherein said system is configured to selectively launch light of one spatial mode i, and collect Rayleigh backscatter of a particular spatial mode j, wherein the launch mode i and the collected mode j, form one mode-pair u=i−j; and wherein the system is configured to scan the wavelength of the light source and the stack detector output signals a 2-dimensional Rayleigh pattern of mode-pairs is constructed.

4. The system of claim 3 configured to adjust wavelength shift vs. temperature/strain change.

5. The system of claim 3 wherein the detector is a coherent receiver.

* * * * *